United States Patent
Weber

(10) Patent No.: US 7,032,383 B2
(45) Date of Patent: Apr. 25, 2006

(54) CONNECTING DUCT FOR FLUID COMPRESSION SYSTEM

(75) Inventor: John Roger Weber, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 71 days.

(21) Appl. No.: 10/658,531

(22) Filed: Sep. 10, 2003

(65) Prior Publication Data

US 2005/0050889 A1   Mar. 10, 2005

(51) Int. Cl.
F02B 33/44 (2006.01)
F24H 9/12 (2006.01)
F01B 31/00 (2006.01)
G01F 1/44 (2006.01)

(52) U.S. Cl. .............. 60/612; 138/37; 138/39; 60/696; 415/211.2; 181/224; 73/861.63

(58) Field of Classification Search ............ 60/612, 60/696; 138/37, 39, 13; 181/227, 224; 415/211.2; 123/198 E; 285/223; 73/681.63
See application file for complete search history.

(56) References Cited

U.S. PATENT DOCUMENTS

| | | | | | |
|---|---|---|---|---|---|
| 411,864 | A | * | 10/1889 | Leycraft | 138/39 |
| 1,467,168 | A | * | 9/1923 | Kapplan | 138/37 |
| 1,955,070 | A | * | 4/1934 | Jessop et al. | 138/37 |
| 2,060,101 | A | * | 11/1936 | Moody | 415/211.2 |
| 2,662,553 | A | * | 12/1953 | Dimmock | 138/37 |
| 3,490,236 | A | * | 1/1970 | Markowski | 138/39 |
| 3,623,511 | A | * | 11/1971 | Levin | 138/39 |
| 4,032,262 | A | * | 6/1977 | Zehnder | 60/612 |
| 4,196,593 | A | * | 4/1980 | Froeliger | 60/612 |
| 4,779,586 | A | * | 10/1988 | White, Jr. | 123/198 E |
| 4,986,732 | A | * | 1/1991 | Stock et al. | 138/155 |
| 5,338,155 | A |   | 8/1994 | Kreitmeier | |
| 6,499,770 | B1 | * | 12/2002 | Glista et al. | 285/223 |
| 6,655,141 | B1 | * | 12/2003 | Faletti | 60/612 |
| 6,729,843 | B1 | * | 5/2004 | Nichtawitz et al. | 415/211.2 |

* cited by examiner

Primary Examiner—Thai-Ba Trieu
(74) Attorney, Agent, or Firm—Finnegan, Henderson, Farabow, Garrett & Dunner LLP

(57) ABSTRACT

A connecting duct for providing a fluid pathway between an outlet of a low pressure compressor and an inlet of a high pressure compressor is provided. The connecting duct includes a main body that defines a fluid pathway adapted to direct a flow of fluid between a main body inlet and a main body outlet. The main body also includes a diffusing section that decreases a velocity of the flow of fluid. A flow de-swirling section is disposed between the diffusing section and the outlet of the main body. The flow de-swirling section straightens the flow of fluid.

21 Claims, 3 Drawing Sheets

CONNECTING DUCT FOR FLUID COMPRESSION SYSTEM

TECHNICAL FIELD

The present invention relates to a fluid compression system and, more particularly, to a connecting duct for a fluid compression system having a series of compression stages.

BACKGROUND

Many applications require a supply of a pressurized fluid, such as, for example, pressurized air. These applications may include a compression system that increases the pressure of a fluid from a first pressure to a second pressure for use in the particular application. The compression system may include a series of compression stages that apply work to the fluid to achieve the desired pressure increase. For example, the compression system may include a first compressor that increases the pressure of the fluid from a first pressure to an intermediate pressure and a second compressor that increases the pressure of the fluid from the intermediate pressure to the second pressure.

A vehicle such as, for example, an on highway truck, is one example of an application that may require a flow of pressurized air. A compression system on a vehicle may include one or more superchargers and/or turbochargers that increase the pressure of a flow of intake air for an internal combustion engine. The pressurized intake air may be used to increase the air mass within the combustion chambers of the engine, which may lead to an increase in the mass of fuel that may be injected and, thus, an increase in the power output of the engine. A compression system with a greater efficiency may provide a greater power increase than a compression system with a lower efficiency.

The efficiency of a compression system may be increased by reducing the amount of energy required to increase the pressure of the fluid from the first pressure to the second pressure. A compressor may most efficiently increase the pressure of a flow of fluid when the fluid enters the compressor with a uniform flow profile, such as, for example, in a laminar flow. However, the fluid flowing out of a compressor typically includes a rotational component or vortex. This rotational component contains dynamic pressure that may be lost when the fluid flow enters a second compressor. Thus, additional energy may be required to drive the second compressor to achieve the desired pressure increase. In other words, the presence of the swirl, or other irregularity in the fluid flow between compression stages, may result in a reduction of the overall efficiency of the compression system.

The present disclosure is directed to overcoming one or more of the problems as set forth above.

SUMMARY OF THE INVENTION

According to one aspect, the present disclosure is directed to a connecting duct for providing a fluid pathway between an outlet of a low pressure compressor and an inlet of a high pressure compressor. The connecting duct includes a main body that defines a fluid pathway adapted to direct a flow of fluid between a main body inlet and a main body outlet. The main body also includes a diffusing section that decreases a velocity of the flow of fluid. A flow de-swirling section is disposed between the diffusing section and the outlet of the main body to straighten the flow of fluid.

According to another aspect, the present disclosure is directed to a method of compressing a flow of fluid. A flow of fluid is compressed from a first pressure to an intermediate pressure with a first compressor. A velocity of the flow of fluid from the first compressor is reduced. The flow of fluid is straightened. The flow of fluid is compressed to a second pressure with a second compressor.

DETAILED DESCRIPTION

Figure 1:
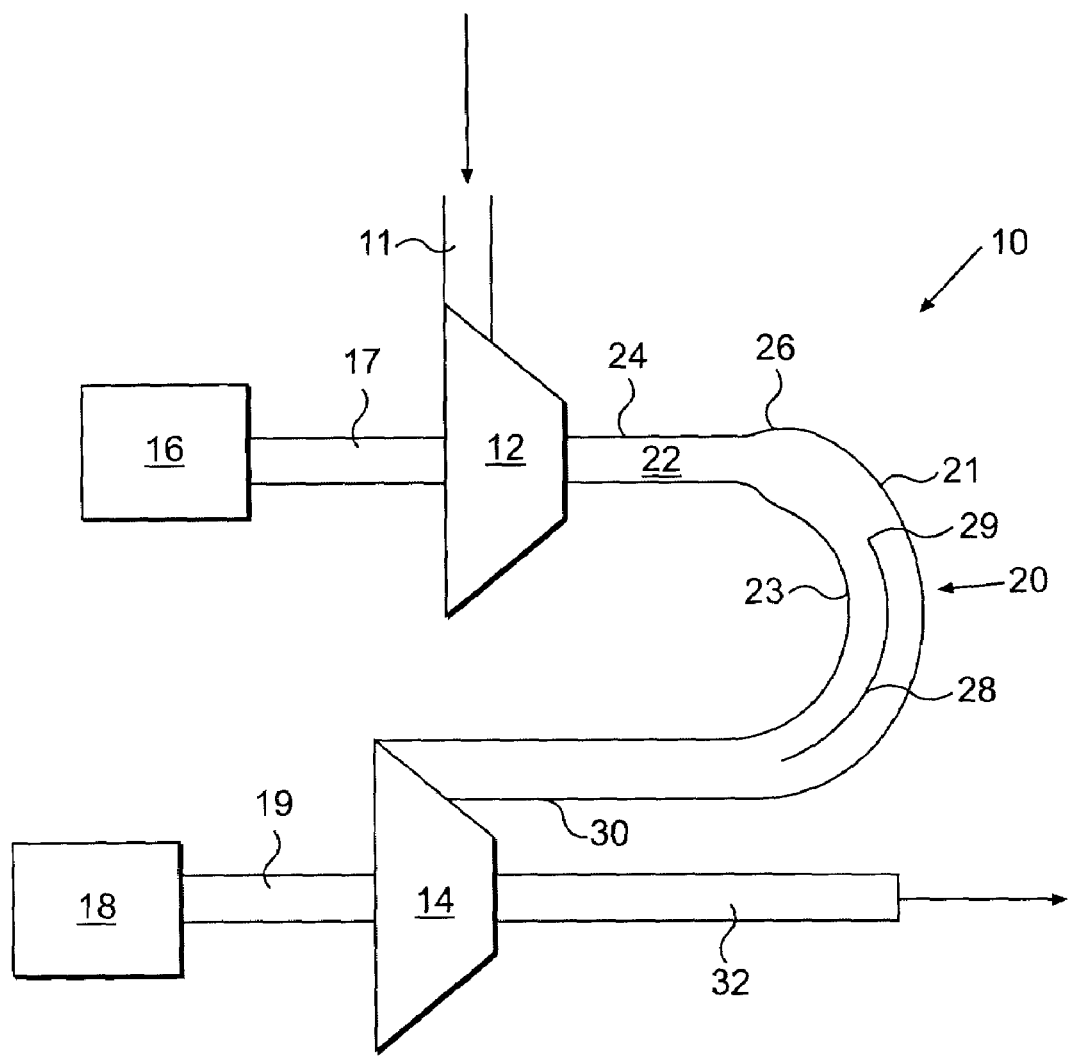
FIG. 1 is a diagrammatic and schematic illustration of a compression system in accordance with an exemplary embodiment of the present invention.

FIG. 1 illustrates an exemplary embodiment of a compression system 10. Compression system 10 includes a first compressor 12 and a second compressor 14. First and second compressors 12 and 14 may be radial compressors, such as, for example, impeller type compressors. First and second compressors 12 and 14 may also be any other type of compressor that is typically used in a turbocharging or supercharging system that may be associated with an internal combustion engine.

Compression system 10 also includes an inlet passage 11. Inlet passage 11 directs a flow of fluid to an inlet of first compressor 12. The fluid may be, for example, air, such as intake air for an internal combustion engine.

Compression system 10 may also include a power source to drive first compressor 12. The power source may be a first motor 16 that is connected to first compressor 12 through a shaft 17. It is contemplated that compression system 10 may include other types of power sources to drive first compressor 12. For example, the power source may be a turbine, such as when first compressor 12 is included within a turbocharger.

First motor 16 may be operated to drive first compressor 12. The operation of first compressor 12 may increase the pressure of the fluid received through inlet passage 11. The pressurized fluid may be discharged through the outlet of first compressor 12.

Compression system 10 may include a connecting duct 20 that has a main body 21, a duct inlet 24, and a duct outlet 30. Main body 21 defines a fluid passageway 22 between duct inlet 24 and duct outlet 30. Fluid passageway 22 of connecting duct 20 may have, for example, a substantially circular cross-sectional shape. Duct inlet 24 may be connected to the outlet of first compressor 12 and duct outlet 30 may be connected to an inlet of second compressor 14 to provide fluid communication between first and second compressors 12 and 14.

Figure 2:
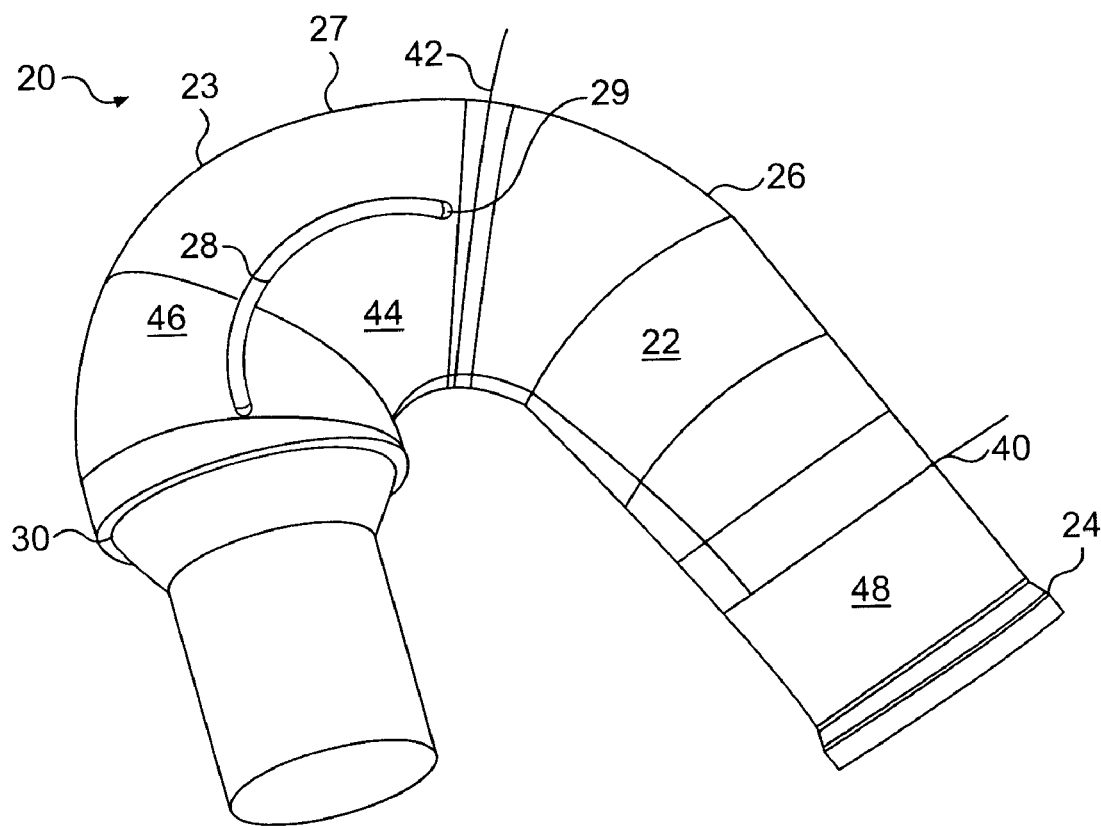
FIG. 2 is a top plan view of a connecting duct for a compression system in accordance with an exemplary embodiment of the present invention.

As shown in FIG. 2, duct inlet 24 may include a flexible section 48. Flexible section 48 may include, for example, a series of bellows that provide for easy connection with the outlet of first compressor 12. One skilled in the art will recognize that connecting duct 20 may be connected to first and second compressors 12 and 14 in any readily apparent manner.

Connecting duct 20 may also include an arcuate section 23. Arcuate section 23 may redirect the flow of fluid between first compressor 12 and second compressor 4. For example, arcuate section 23 may redirect the flow of fluid through an angle of between about 90° and 180°. Arcuate section 23 may allow first and second compressor 12 and 14 to be arranged relative to the other in a manner that reduces the total amount of space required for compression system 10.

Compression system 10 may also include a power source to drive second compressor 14. The power source used to drive second compressor 14 may be similar to the power source used to drive first compressor 12. For example, compression system 10 may include a second motor 18 that is connected to second compressor 14 through a shaft 19. Alternatively, compression system 10 may drive second compressor 14 with a power source that is different than the power source used to drive first compressor 12. For example, first compressor 12 may be driven by a motor, whereas second compressor 14 is driven by a turbine.

Second motor 18 may be operated to drive second compressor 14. The operation of second compressor 14 may further increase the pressure of the fluid received through connecting duct 20. The pressurized fluid may be discharged from second compressor 18 through a fluid outlet 32.

Compression system 10 may be adapted to increase the pressure of the flow of fluid from a first pressure, which may be, for example, ambient pressure, to a second pressure. First compressor 12 may be adapted to increase the pressure of the flow of fluid from the first pressure to an intermediate pressure. Second compressor 14 may be adapted to further increase the pressure of the flow of fluid from the intermediate pressure to the second pressure. Since second compressor 14 compresses the fluid to a higher pressure than first compressor 12, second compressor 14 may be referred to as a high pressure compressor and first compressor 12 may be referred to as a low pressure compressor.

First and second compressors 12 and 14 may be sized to provide substantially similar compression ratios. For example, first and second compressors 12 and 14 may both provide compression ratios of between 1.5 to 1 and 3 to 1. Alternatively, first and second compressors 12 and 14 may have different compression ratios. For example, first compressor 12 may have a compression ratio of 1.5 to 1 and second compressor 14 may have a compression ratio of 3 to 1.

It should be noted that compression system 10 may include additional compression stages. Some applications may require a greater increase in fluid pressure that may be best achieved by adding additional compression stages. It is contemplated connecting duct 20 may be used to provide fluid communication with the additional compression stages.

As will be recognized by one skilled in the art, the flow of fluid leaving first compressor 12 will typically include a steady swirl, such as, for example, a rotational component or vortex. This swirl is caused by the exit characteristics of the compressor. The swirl may include a relatively high magnitude of dynamic energy. Connecting duct 20 may be adapted to recover the dynamic energy from the swirl.

As shown in FIG. 2, connecting duct 20 may include a diffuser 26 and a flow de-swirling section 27. Diffuser 26 is adapted to reduce the velocity of the flow of fluid. Flow de-swirling section 27 is adapted to straighten the flow of fluid. For the purposes of the present disclosure, the phrase "straighten the flow" includes reducing the swirl induced by first compressor 12 or altering the profile of the fluid flow to achieve a substantially uniform flow profile.

Diffuser 26 includes a diffuser inlet 40 and a diffuser outlet 42. Diffuser inlet 40 has a cross-sectional area that is less than the cross-sectional of diffuser outlet 42. The increase in the cross-sectional area of flow passageway 22 between diffuser inlet 40 and diffuser outlet 42 will cause a reduction in the velocity of the fluid flowing through diffuser 26. Thus, diffuser 26 will decrease the velocity of the pressurized fluid flowing from the outlet of first compressor 12.

Flow de-swirling section 27 is connected with diffuser outlet 42. Flow de-swirling section 27 includes a turning vane 28, which divides flow passageway 22 into a first flow path 44 and a second flow path 46. Turning vane 28 will, therefore, split the flow of fluid into a first flow through first flow path 44 and a second flow through second flow path 46. Turning vane 28 may be disposed in actuate section 23 to divide the flow of fluid after the fluid has passed through a predetermined portion of arcuate section 23. For example, a leading edge 29 of turning vane 28 may be positioned to split the flow of fluid after direction of flow of fluid has been changed by approximately 30°.

Turning vane 28 and the walls of connecting duct 20 surrounding turning vane 28 will act to straighten the flow of fluid. The curvature of arcuate section 23 may be adapted to oppose the swirl induced at the exit of first compressor 12. In addition, the relative positioning of turning vane 28 within arcuate section 23 may further reduce the amount of swirl in the flow of fluid. In other words, the swirl may act to turn the flow of fluid into turning vane 28 and the walls of main body 21. The impingement of the flow of fluid into turning vane 28 and the walls of main body 21 may act to straighten the flow. In this manner, the profile of the flow of fluid through connecting duct 20 may be altered to reduce the amount of swirl and/or approach a uniform flow profile.

Figure 3:
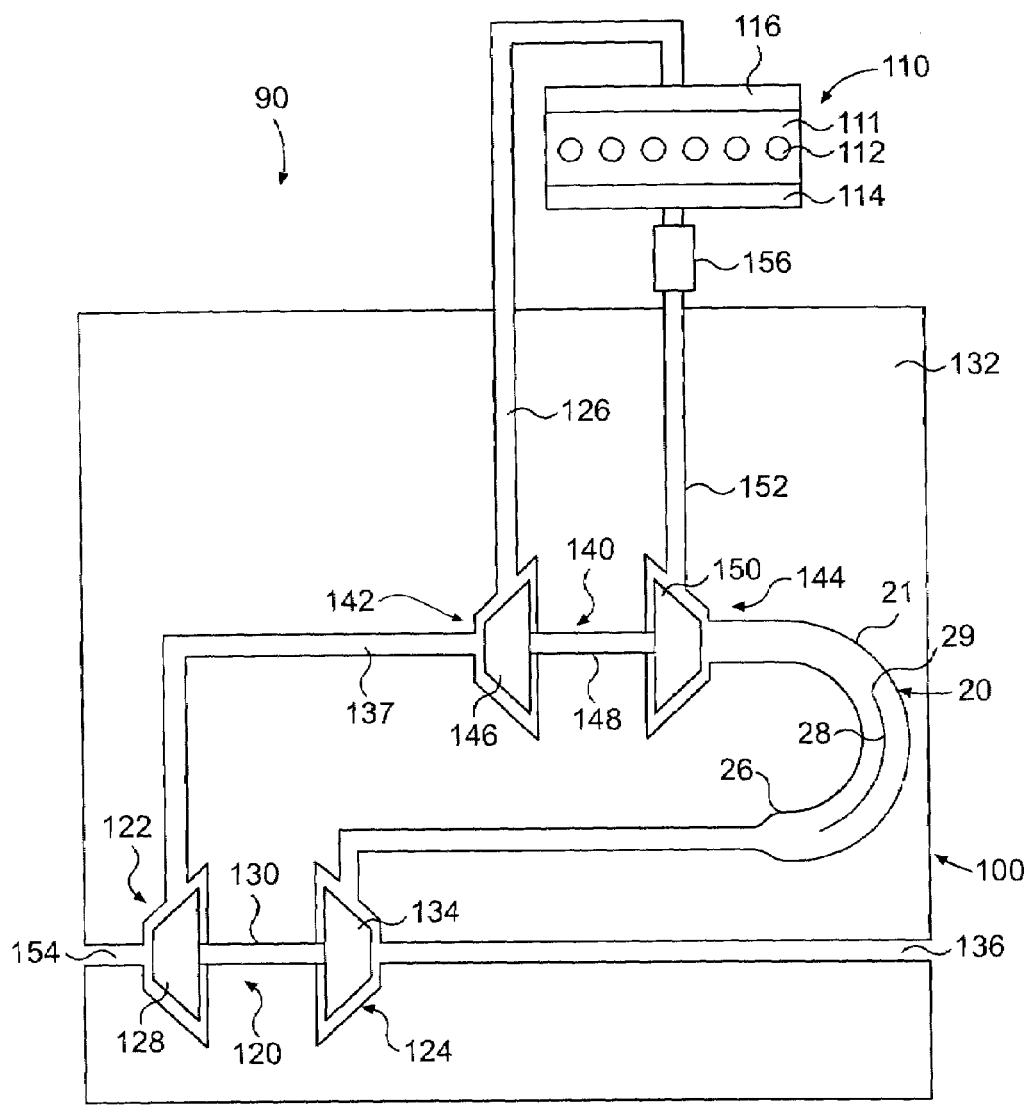
FIG. 3 is a diagrammatic and schematic illustration of an exemplary engine system having a compression system in accordance with an exemplary embodiment of the present invention.

It is contemplated that the above described compression system may be used in a variety of applications. For example, as shown in FIG. 3, a compression system 100 may be included in a vehicle 90 to provide pressurized air to an intake manifold of an internal combustion engine 110. The engine 110 includes an engine block 111 defining a plurality of combustion chambers 112. In the illustrated embodiment, engine 110 includes six combustion chambers. It is contemplated that engine 110 may include a greater or lesser number of combustion chambers, depending upon the particular application.

Internal combustion engine 110 may also include an intake manifold 114 and an exhaust manifold 116. Intake manifold 114 provides fluid, such as, for example, air or a fuel/air mixture, to the combustion chambers 112. The exhaust manifold 116 receives exhaust gas from combustion chambers 112.

Compression system 100 may include a first turbocharger 120 and a second turbocharger 140 that are arranged in series. First turbocharger 120 may have a first turbine 122 that includes a turbine wheel 128 and a first compressor 124 that includes a compressor wheel 134. First turbocharger 120 may further include a first shaft 130 that is rotatably mounted within a housing 132 and carries both turbine wheel 128 and compressor wheel 134. A rotation of turbine wheel 128 will, therefore, result in a corresponding rotation of compressor wheel 134.

Second turbocharger 140 may have a second turbine 142 that includes a turbine wheel 146 and a second compressor 144 that includes a compressor wheel 150. Second turbocharger 140 may further include a second shaft 148 that is rotatably mounted within housing 132 and carries both turbine wheel 146 and compressor wheel 150. A rotation of turbine wheel 146 will, therefore, result in a corresponding rotation of compressor wheel 150.

An air inlet 136 may provide fluid communication between the atmosphere and first compressor 124. Connecting duct 20 may provide fluid communication between first compressor 124 and second compressor 144. An intake duct 152 may provide fluid communication between second compressor 144 and intake manifold 114.

One or more air coolers 156 may be disposed in intake duct 152. Air coolers 156 are structured and arranged to extract heat from the air to lower the intake manifold temperature and to increase the air density. It is contemplated that an additional air cooler (not shown), for example, an intercooler, may be disposed between first compressor 124 and second compressor 144.

It should be noted that an inter-stage air cooler, such as a heat exchanger, may be combined with connecting duct 20 and/or turning vane 28. For example, turning vane 28 may include an internal passage (not shown) through which a coolant may be directed. The coolant may absorb heat from the flow of fluid passing through connecting duct 20. In this manner, the temperature of the flow of fluid may be reduced as the fluid flows from first compressor 12 to second compressor 14.

An exhaust duct 126 may connect exhaust manifold 116 with second turbine 142. The fluid flow path from the exhaust manifold 116 to the second turbine 142 may include a variable nozzle (not shown) or other variable geometry arrangement adapted to control the velocity of exhaust fluid impinging on turbine wheel 146. A conduit 137 may provide fluid communication between second turbine 142 and first turbine 122. An exhaust outlet 154 may provide fluid communication between first turbine 122 and the atmosphere.

INDUSTRIAL APPLICABILITY

For the purposes of explaining its operation, the compression system of the present disclosure will be described in connection with the vehicle application described above and illustrated in FIG. 3. During standard vehicle use, internal combustion engine 110 may operate in a known manner using, for example, the diesel principle of operation. Internal combustion engine 110 will draw intake air through intake manifold 114 and will expel exhaust gases to exhaust manifold 116.

With reference to FIG. 3, exhaust gas from the internal combustion engine 110 is directed from exhaust manifold 116 to exhaust duct 126. Exhaust duct 126 directs the exhaust gas to second turbocharger 140, where the exhaust gas impinges on and causes rotation of turbine wheel 146. The rotation of turbine wheel 146 causes a corresponding rotation of compressor wheel 150. The rotational speed of compressor wheel 150 will therefore correspond to the rotational speed of turbine wheel 146.

The exhaust gas exits second turbocharger 140 through conduit 137, which directs the exhaust gas to first turbocharger 120. The exhaust gas impinges on and causes rotation of turbine wheel 128. The rotation of turbine wheel 128 causes a corresponding rotation of compressor wheel 128. The rotational speed of compressor wheel 134 will, therefore, correspond to the rotational speed of turbine wheel 128. Exhaust gas from the first turbocharger 120 may be directed to the atmosphere via exhaust outlet 154.

Rotation of compressor wheel 134 of first turbocharger 120 draws air from the atmosphere through air inlet 136. Compressor wheel 134 applies work to the air to increase the pressure of the air from an ambient pressure to an intermediate pressure and directs the flow into connecting duct 20. In this manner, a portion of the energy of the exhaust gas from engine 110 is used to increase the pressure of the intake air flow.

As noted previously, the flow of air exiting first compressor 124 may include a constant swirl. This swirl represents dynamic pressure that may be recaptured. The dynamic pressure may be recaptured by reducing the velocity of the flow of fluid and then straightening the flow of fluid.

The velocity at which the air is flowing will decrease as the flow of air passes through diffuser 26. The flow area of diffuser 26 increases between diffuser inlet 40 and diffuser outlet 42. The reduction in velocity also translates to an increase in the flow pressure of the fluid as some of the dynamic pressure of is converted to flow pressure.

As the flow of air enters de-swirling section 27, the flow of air is split into two flows by turning vane 28. The split in flow provides a narrowed diameter flow path for each flow of fluid. The walls of the first flow path 44 and second flow path 46 (referring to FIG. 2) will act to straighten, or de-swirl, the flow of fluid. The straightened flow may then be directed through duct outlet 30.

The air flows from duct outlet 30 to second compressor 144. Compressor wheel 150 of second compressor 144 further increases the pressure of the air to a second pressure. The flow of pressurized air may then be directed to intake manifold 114 of engine 110 via air outlet line 152. The compressed air may be cooled by one or more air coolers 156 before reaching intake manifold 114. The pressurized air flows from intake manifold 114 into combustion chambers 112.

Accordingly, the described connecting duct may increase the efficiency of a multi-stage compression system. The efficiency increase results from the recapture of dynamic pressure present in a flow of fluid that leaves a first compressor. The flow of fluid is also straightened to approach a uniform profile flow. This allows the second compressor to increase the pressure of the fluid to the desired magnitude with a reduced energy input. It is contemplated that the concepts of the present disclosure may be applied to any multi-stage compression system, including, for example, an intake air compression system for an internal combustion engine.

It will be apparent to those skilled in the art that various modifications and variations can be made in the disclosed compression system without departing from the scope of the disclosure. Other embodiments of the system may be apparent to those skilled in the art from consideration of the specification and practice of the system disclosed herein. It is intended that the specification and examples be considered as exemplary only.

What is claimed is:

1. A method of compressing a flow of fluid, comprising:
compressing a flow of fluid from a first pressure to an intermediate pressure with a first compressor;
reducing a velocity of the flow of fluid from the first compressor by providing a diffuser having an inlet and an outlet and wherein the cross-sectional area of the diffusing section outlet is greater than the cross-sectional area of the diffusing section inlet;
straightening the flow of fluid; and
compressing the flow of fluid from the intermediate pressure to a second pressure with a second compressor.

2. The method of claim 1, further including directing a flow of compressed fluid from the second compressor to an intake manifold of an internal combustion engine.

3. The method of claim 1, further including:
driving the first compressor with a first turbine; and
driving the second compressor with a second turbine.

4. The method of claim 3, further including directing a flow of exhaust gas from an exhaust manifold of an internal combustion engine to the first and second turbines to thereby drive the first and second compressors.

5. The method of claim 1, further including changing the direction of the fluid flow from the first compressor to the second compressor by between about 90° and 180°.

6. A connecting duct for providing a fluid pathway between an outlet of a low pressure compressor and an inlet of a high pressure compressor, comprising:
a main body defining a fluid pathway adapted to direct a flow of fluid between a main body inlet coupled to the low pressure compressor and a main body outlet coupled to the high pressure compressor, the main body including:
a diffusing section adapted to decrease a velocity of the flow of fluid; and
a flow de-swirling section disposed between the diffusing section and the main body outlet, the flow de-swirling section adapted to straighten the flow of fluid.

7. The duct of claim 6, wherein the main body has a substantially circular cross-sectional shape.

8. The duct of claim 6, wherein the diffusing section has an inlet and an outlet and wherein the cross-sectional area of the diffusing section outlet is greater than the cross-sectional area of the diffusing section inlet.

9. The duct of claim 6, wherein the flow de-swirling section includes an arcuate portion.

10. The duct of claim 9, wherein the arcuate portion changes a direction of the flow of fluid between about 90° and 180°.

11. The duct of claim 10, further including a turning vane disposed in the de-swirling section and adapted to reduce the magnitude of turbulence in the flow of fluid.

12. The duct of claim 11, wherein a leading edge of the turning vane is disposed to engage the flow of fluid after the flow of fluid has passed through a predetermined distance in the arcuate portion.

13. The duct of claim 6, further including a flexible section adapted for connection to the outlet of the low pressure compressor.

14. A system for compressing a fluid, comprising:
a first compressing means for compressing a flow of fluid;
a second compressing means for further compressing the flow of fluid; and
a duct having a main body adapted to direct a flow of fluid between the first compressing means and the second compressing means, the main body further including:
a diffusing means for decreasing a velocity of the flow of fluid from a first velocity at an outlet of the first compressing means to a second velocity at an inlet of the second compressing means, the diffusing means having an inlet and an outlet, the cross-section of the diffusing means inlet being smaller than the cross-section of the diffusing means outlet; and
a de-swirling means for removing a swirl from the flow of fluid, the de-swirling means disposed between the diffusing means and the inlet of the second compressing means.

15. A system for compressing a fluid, comprising:
a first compressor having an inlet and an outlet;
a second compressor having an inlet and an outlet; and
a duct having a main body adapted to direct a flow of fluid between the outlet of the first compressor and the inlet of the second compressor, the main body further including:
a diffusing section adapted to decrease a velocity of the flow of fluid from a first velocity at the outlet of the first compressor to a second velocity at the inlet of the second compressor, the diffusing section having an inlet and an outlet, the cross-section of the diffusing section inlet being smaller than the cross-section of the diffusing section outlet; and
a flow de-swirling section disposed between the diffusing section and the outlet of the main body, the flow de-swirling section adapted to straighten the flow of fluid.

16. The system of claim 15, further including:
a first turbine adapted to drive the first compressor; and
a second turbine adapted to drive the second compressor.

17. The system of claim 15, wherein the diffusing section has an inlet and an outlet and wherein the cross-sectional area of the outlet is greater than the cross-sectional area of the inlet.

18. The system of claim 15, wherein the flow de-swirling section includes an arcuate portion adapted to change a direction of the flow of fluid between about 90° and 180°.

19. The system of claim 18, further including a turning vane disposed in the arcuate portion of the de-swirling section and adapted to reduce the magnitude of turbulence in the flow of fluid.

20. The system of claim 19, wherein a leading edge of the turning vane is disposed to engage the flow of fluid after the flow of fluid has passed through a predetermined distance in the arcuate portion.

21. A connecting duct for providing a fluid pathway between an outlet of a low pressure compressor and an inlet of a high pressure compressor, comprising:
a main body defining a fluid pathway adapted to direct a flow of fluid between a main body inlet and a main body outlet, the main body including:
a diffusing section adapted to decrease a velocity of the flow of fluid wherein the diffusing section has an inlet and an outlet, wherein the diffusing section outlet is coupled to the high pressure compressor and wherein the cross-sectional area of the diffusing section outlet is greater than the cross-sectional area of the diffusing section inlet; and
a flow de-swirling section disposed between the diffusing section and the main body outlet, the flow de-swirling section adapted to straighten the flow of fluid.

* * * * *